United States Patent [19]

McDermott et al.

[11] Patent Number: 5,157,227
[45] Date of Patent: Oct. 20, 1992

[54] DIGITIZER TABLET WITH REGIONAL ERROR CORRECTION

[75] Inventors: Robert M. McDermott, Weston; Michael Bals, New Haven, both of Conn.

[73] Assignee: Summagraphics Corporation, Seymour, Conn.

[21] Appl. No.: 642,296

[22] Filed: Jan. 17, 1991

[51] Int. Cl.$^5$ .............................................. G08C 21/00
[52] U.S. Cl. .................................................... 178/19
[58] Field of Search ..................................... 178/18, 19

[56] References Cited

U.S. PATENT DOCUMENTS 4,798,920  1/1989  Makino et al. ........................ 178/19

FOREIGN PATENT DOCUMENTS 0172657  7/1985  European Pat. Off. .

Primary Examiner—Stafford D. Schreyer
Attorney, Agent, or Firm—Rosen, Dainow & Jacobs

[57] ABSTRACT

A digitizer tablet exhibiting improved regional error correction comprises evaluation of two linear equations to correct the generated raw coordinates. The equations contain certain constants unique to tablet regions exhibiting similar error patterns. These constants are empirically determined and stored for use in the evaluations.

19 Claims, 3 Drawing Sheets

DIGITIZER TABLET WITH REGIONAL ERROR CORRECTION

This invention relates to digitizer tablets, and in particular to digitizer tablets providing improved regional error correction.

BACKGROUND OF INVENTION

Digitizer tablets are well known in the art. In one popular type, the pointing device comprises a coil in a cursor or stylus configuration which is positioned by a user over a tablet surface in which is embedded an electrically conductive grid extending in two coordinate directions. In one mode, the pointing device coil is energized to electromagnetically induce signals in the grid conductors. In another mode, the grid conductors are energized to electromagnetically induce signals in the pointing device coil. In other types, electrostatics are employed; in still others acoustics, or resistive characteristics are employed. In all cases, a signal or set of signals are processed to determine the location of a movable pointing device upon a surface, based on the known characteristics of these signals. Examples of patents describing in more detail the first type of digitizer are Kamm et al. U.S. Pat. Nos. 3,904,822; Ioanau 3,873,770; and Zimmer 4,368,351, whose contents are hereby incorporated by reference. BYTE, January 1989, pages 162–174, gives a general description of such devices and their performances.

A problem has been observed during the operation of such tablets. It has been observed that, when the pointing device is held over certain regions of the tablet's working surface, usually the edge or corner regions, the position of the cursor displayed on the display device connected to the computer that is converting the pointing device position does not accurately represent the true position of the pointing device, due primarily to regional anomalies of the signals (compared to their ideal characteristics). Analysis has demonstrated that the coordinate pairs outputted by the tablet exhibit non-random errors. It is known, for example, that the errors are a function of the relative location on the tablet working surface area where the pointing device is positioned. Typically, the reported coordinates are more accurate from the tablet center than from the tablet edges. This is understood to be due to so-called edge effects, that is, non-uniformities in the generated electrical fields due to, for example, signal return lines running along a tablet edge, or the transducer's fields extending beyond the grid edge, or extraneous fields extending beyond the grid edge, or extraneous fields extending from connectors or components mounted about the grid periphery.

One known technique for correcting for such non-random errors is to apply the inverse of the error effects. For example, if the errors are known to increase as the pointing device approaches the left tablet edge, decrease the reported coordinates as the left tablet edge is approached. At the other extreme, the coordinate determination may be structured to model the nonuniformities of the signals across the entire surface area. In principle, it might be possible to construct a multi-dimensional, multi-ordered polynomial equation to fit the error contour across the tablet surface, but such a solution even if possible would be too costly to implement in a reasonably priced tablet with acceptable performance, since it would require an expensive high speed processor to compute such an equation for each coordinate within the coordinate report time constraint.

Many commercial tablets employ a first-order correction algorithm using a fairly primitive straight line edge correction in selected regions. However, this is not entirely satisfactory because the error characteristics in the typical tablet are multi-dimensional, meaning, for example, that any assumed correction straight line for one Y axis position would not accurately represent the slope of a correction straight line for an adjacent Y axis position. Moreover, the assumed straight line intercept also varies with coordinate position, which introduces another error into the correction.

The problem is compounded at corner tablet regions, where errors arise due to a combination of a side edge effect and a top or bottom edge effect.

SUMMARY OF THE INVENTION

The chief object of the invention is a digitizer tablet having improved accuracy for coordinates reported at regions prone to error.

Another object of the invention is a digitizer tablet employing a modestly priced processor capable of correcting errors in reported coordinates without sacrificing the report rate.

The invention is based on the recognition that there exists a general solution for each region of the tablet requiring correction. In accordance with a preferred embodiment, the general solution involves linear equations, and in particular a first linear equation for the X coordinate, and a second linear equation for the Y coordinate. Both equations relate corrected coordinates for a particular axis of the tablet for the pointing device to plural tablet axes, usually both the X and Y axes. Each of these equations is characterized by a sum of terms involving constants unique to the tablet region to be corrected.

In accordance with a feature of the invention, a series of measurements are carried out over each tablet region to be corrected. From these measurements, the deviations of the raw coordinates from the true coordinates are determined. Each of the equations or their equivalent (as explained below) are then evaluated to determine the constants of their sum terms. These constants for each tablet region to be corrected are stored. When the user operates the tablet, and the pointing device is positioned over a region requiring correction, the equations are again evaluated in real time using the raw coordinates and the stored constants, producing and generating corrected coordinates for that pointing device position. Since only two linear equations require evaluation to generate the corrected coordinates, it can readily be accomplished in real time with the type of modestly priced processor conventionally used in such tablets without any significant penalty in the report rate.

Further details on how to implement the invention, as well as other objects and advantages of the invention, will be evident from the detailed description that follows of a preferred embodiment taken in conjunction with the accompanying drawings.

DETAILED DESCRIPTION OF PREFERRED EMBODIMENTS

Figure 1:
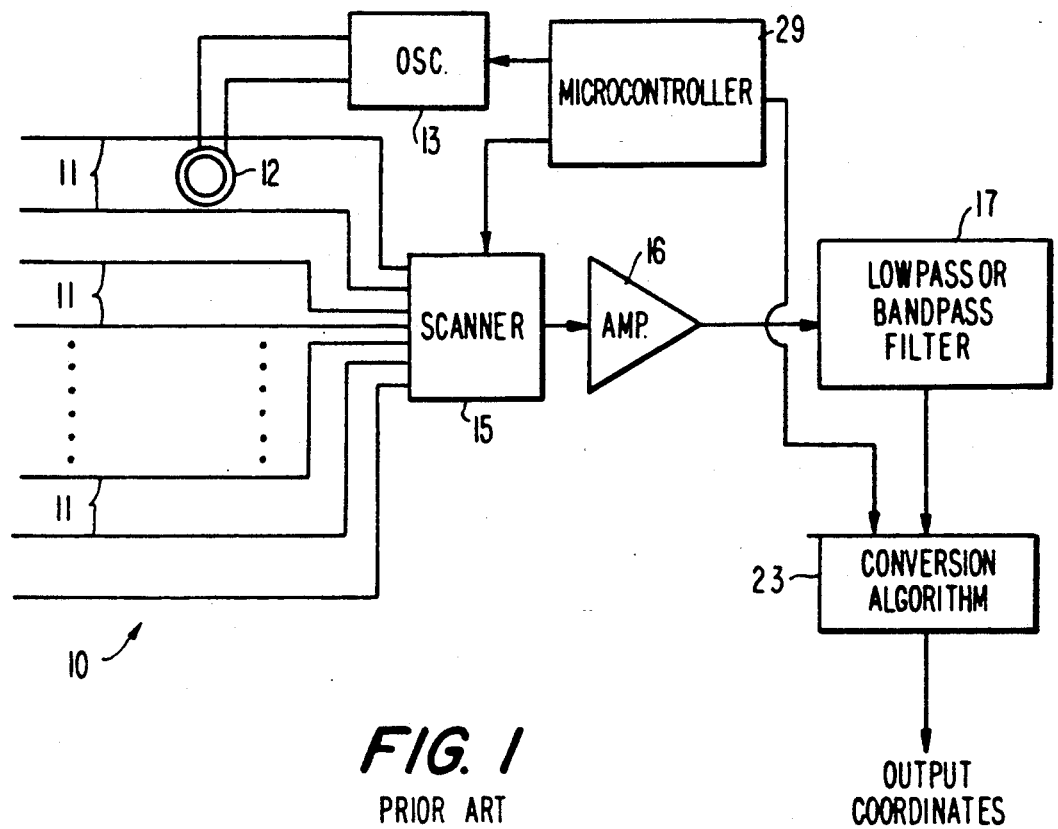
FIG. 1 is a block diagram of a typical digitizer tablet to illustrate how the problem solved by the invention arises.

FIG. 1 illustrates, in a block diagram, a system in accordance with the invention. The tablet 10 is indicated by an electrode array of parallel conductors 11, useful for indicating the position of a pointing device 12 represented by a coil in one coordinate direction, say the Y direction. As is conventional, a second array of conductors, orthogonal to the first, would be provided to furnish information about the pointing device position in the X direction. This has not been shown because the operation is identical, and it will be understood that the invention is not limited to determining only one coordinate but encompasses also two or more coordinates as is conventional. In the example illustrated, the pointing device is excited by an AC source 13—10–100 KHz is common—causing voltages to be induced in the array conductors 11. Each of the array conductors are sequentially addressed by a known scanner 15—essentially a multiplexer—which connects to each conductor in turn. The addressing order is not important to the invention.

Each time that the scanner 15 connects to an array conductor 11, the induced signal voltage is detected and amplified in an amplifier 16. These signals are typically filtered through a low pass or bandpass filter 17 which passes the frequency of the oscillator 13. These signals are then converted 23 into a form suitable for processing (e.g. converted from analog to digital for subsequent digital signal processing), and then used to determine the location of the transducer by any number of techniques known to those versed in this art. The results can then be outputted.

Figure 2:
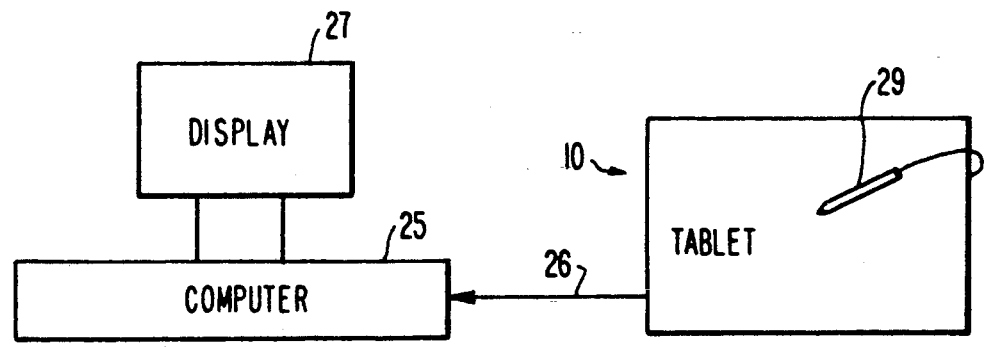
FIG. 2 is a block diagram showing a typical work-station setup employing a tablet in accordance with the invention.

FIG. 2 shows the tablet 10 connected by way of an output cable 26 to the computer console. The computer software then converts the outputted coordinates to a display cursor position on the screen of a display or monitor 27. The pointing device, in this case a stylus 29, is schematically shown in FIG. 2.

The general solution used for tablet region correction, in accordance with the invention, is equations (1) and (2) below:

$$X_c = ax_r + by_r + cx_r y_r + d \quad (1)$$

$$Y_c = ex_r + fy_r + gx_r y_r + h \quad (2)$$

where $X_c$ and $Y_c$ are the corrected coordinates, and $x_r$ and $y_r$ are the raw coordinates. It is noted that each coordinate's (Xc, Yc) correction will be a function of the location of the transducer or pointing device in both axes within the region of interest, as compared to the conventional approach wherein only one axis is used. If $X_{ti}$ and $Y_{ti}$ are the true coordinates for each $i^{th}$ coordinate then:

$$X_{ti} = ax_{ri} + by_{ri} + cx_{ri}y_{ri} + d + r_i \quad (3)$$

$$Y_{ti} = ex_{ri} + fy_{ri} + gx_{ri}y_{ri} + h + s_i \quad (4)$$

where $r_i$, $s_i$ are the errors of the system, including random measurement errors, model inadequacy errors, etc.

The eight constants a–h should be chosen to minimize $|r_i|$ and $|s_i|$ over the tablet region they are applied. Since the absolute value function (magnitude) is difficult to deal with algorithmically, it is preferred to use the square of the errors as the measure to be minimized. Thus, the problem reduces to: find the constants a . . . h such that $r_i^2$ and $s_i^2$ are minimized. Since it is not practical to determine a separate a . . . h for each $i^{th}$ coordinate, it is preferred to find a single set of eight constants a . . . h to minimize the average square error for selected regions of the tablet where one would expect similar or consistent errors. Thus, find a . . . h such that $$\frac{\sum_{N} r_i^2}{N} \text{ and } \frac{\sum_{N} s_i^2}{N} \text{ are minimized.}$$

Applying various mathematical techniques results in the following four equations to find the desired minimums:

(The @ symbol is used here, for convenience, as a substitute for the usual partial derivative symbol which is intended.)

$$\frac{@(\Sigma r_i^2)}{@a} = 0 = 2a\Sigma x_{ri}^2 + 2b\Sigma x_{ri}y_{ri} + 2c\Sigma x_{ri}^2 y_{ri} + 2d\Sigma x_{ri} - 2\Sigma x_{ri}X_{ti} \quad (5)$$

$$\frac{@(\Sigma r_i^2)}{@b} = 0 = 2a\Sigma x_{ri}y_{ri} + 2b\Sigma y_{ri}^2 + 2c\Sigma x_{ri}y_{ri}^2 + 2d\Sigma y_{ri} - 2\Sigma y_{ri}X_{ti} \quad (6)$$

$$\frac{@(\Sigma r_i^2)}{@c} = 0 = 2a\Sigma x_{ri}^2 y_{ri} + 2b\Sigma x_{ri}y_{ri}^2 + 2c\Sigma x_{ri}^2 y_{ri}^2 + 2d\Sigma x_{ri}y_{ri} - 2\Sigma x_{ri}y_{ri}X_{ti} \quad (7)$$

$$\frac{@(\Sigma r_i^2)}{@d} = 0 = 2a\Sigma x_{ri} + 2b\Sigma y_{ri} + 2c\Sigma x_{ri}y_{ri} + 2d - 2\Sigma X_{ti} \quad (8)$$

A similar set of four equations is arrived at to minimize $\Sigma s_i^2$ for the constants e . . . h.

$$\frac{@(\Sigma s_i^2)}{@e} = 0 = 2e\Sigma x_{ri}^2 + 2f\Sigma x_{ri}y_{ri} + 2g\Sigma x_{ri}^2 y_{ri} + 2h\Sigma x_{ri} - 2\Sigma x_{ri}Y_{ti} \quad (9)$$

$$\frac{@(\Sigma s_i^2)}{@f} = 0 = 2e\Sigma x_{ri}y_{ri} + 2f\Sigma y_{ri}^2 + 2g\Sigma x_{ri}y_{ri}^2 + 2h\Sigma y_{ri} - 2\Sigma y_{ri}Y_{ti} \quad (10)$$

$$\frac{@(\Sigma s_i^2)}{@g} = 0 = 2e\Sigma x_{ri}^2 y_{ri} + 2f\Sigma x_{ri}y_{ri}^2 + 2g\Sigma x_{ri}^2 y_{ri}^2 + 2h\Sigma x_{ri}y_{ri} - 2\Sigma x_{ri}y_{ri}Y_{ti} \quad (11)$$

$$\frac{@(\Sigma s_i^2)}{@h} = 0 = 2e\Sigma x_{ri} + 2f\Sigma y_{ri} + 2g\Sigma x_{ri}y_{ri} + 2h - 2\Sigma Y_{ti} \quad (12)$$

Figure 3A:
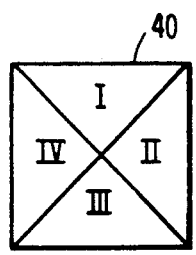
FIGS. 3A–3D are schematic views of several typical tablets divided up into regions exhibiting similar error patterns.
Figure 3B:
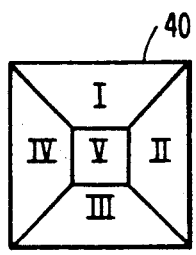
Figure 3C:
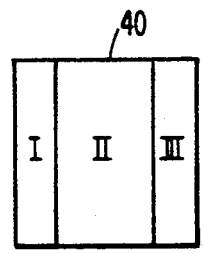
Figure 3D:
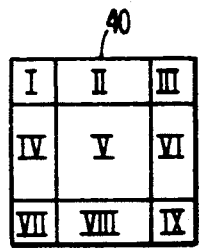

It is noted that these equations (5) . . . (8) are linear functions of a, b, c, d, and, with four equations and four unknowns, the solution for a ... d is unique and solvable. Similarly, for equations (9) ... (12), the solution for determining e ... h is also unique and solvable. Thus, to implement the invention in a preferred embodiment, the following steps are carried out to determine the constants a ... h in the sum terms in equations (5) . .. (12):

A. Identify regions of the tablet having a similar pattern of error effects. This is done from a knowledge of the casual factors causing errors, circuit performance, etc. For example, most tablets will exhibit one of the error patterns shown in FIGS. 3A to 3D, where 40 designates the active surface of the tablet, and each of the regions designated by the roman numerals I ... IX represent tablet regions exhibiting similar error effects. The size and shape of the error regions are determined by the designer to represent the areas with similar error characteristics. It is assumed for the discussion that follows below that the tablet model being processed exhibits the error pattern shown in FIG. 3A.

B. In each of the error regions I ... IV collect at least four points spaced over each of the regions by positioning the pointing device at each of the points and noting the true $X_{ti}$, $Y_{ti}$ and the raw $x_{ri}$, $y_{ri}$ coordinates. The quality of the subsequent parameters a ... h for each error region will be a function of the error associated with these measurements. The inherent error in these measurements can be reduced by taking more points in each region; four is the minimum, the error reduces by $1/(N)^{\frac{1}{2}}$.

C. Compute the $\Sigma$ terms from these measurements for each tablet region $\Sigma x$, $\Sigma y$, $\Sigma^2 y$, $\Sigma x^2 y^2$, etc. as used in the preceding equations (5) ... (8). Repeat the computations for $s_i^2$.

D. Solve the given eight linear equations (5) ... (12) for the eight constants, a–h, for each of the regions I . . . IV. Store these sets of constants for subsequent use.

The above steps are applied to determine the parameters either for entire batches of tablets, if they're consistent, or for individual tablets, if they're not consistent.

The stored constants are used in the following way when a user is operating the tablet in its normal operating mode. Determine from the raw coordinates which region of the four error regions I ... IV the pointing device is positioned over. Using the raw coordinates, and the set of stored constants a ... h for that determined region, evaluate equations (1) and (2) to obtain the corrected coordinates $X_c$ and $Y_c$, and report the latter to the host computer.

The inventive method as described above can be applied to one tablet of a batch of similar tablets with consistent errors, and the resultant set of eight constants included in the PROM typically employed in each tablet. On the other hand, if the individual tablets do not exhibit consistent error patterns, then each tablet would have to undergo the entire procedure to determine its own unique set of eight constants for each determined error region. Typically, that part of the procedure to determine the constants is carried out at the factory in a kind of initialization or testing phase, and each of the equations (1) and (2) evaluated each time that the coordinate pairs are outputted by the tablet to a computer during actual use as shown in FIG. 2.

Figure 4A:
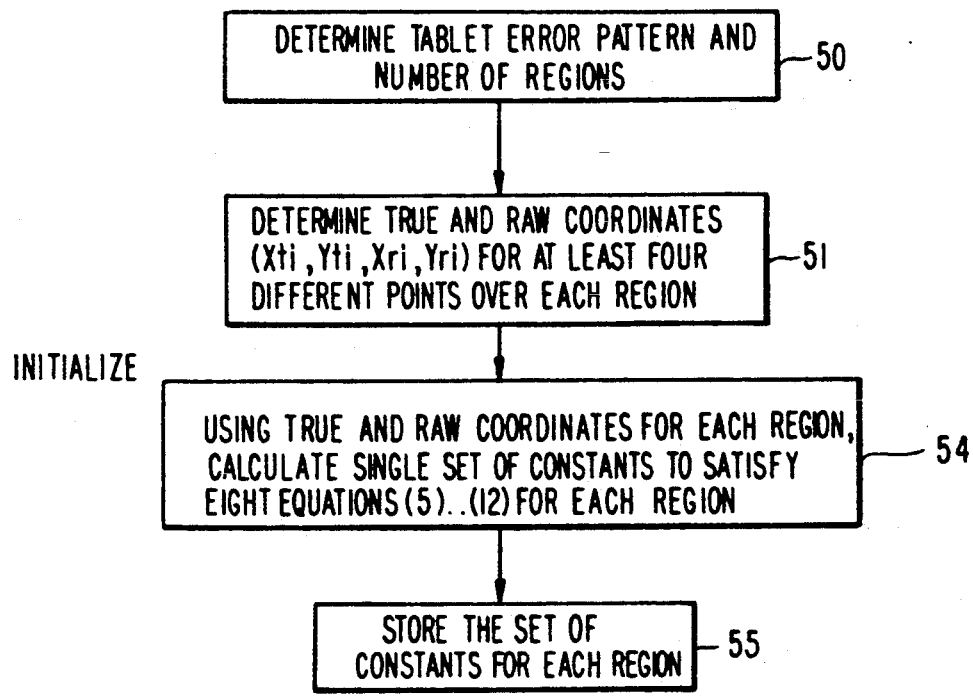
FIGS. 4a and 4b are flow diagrams showing a preferred way to implement the invention.
Figure 4B:
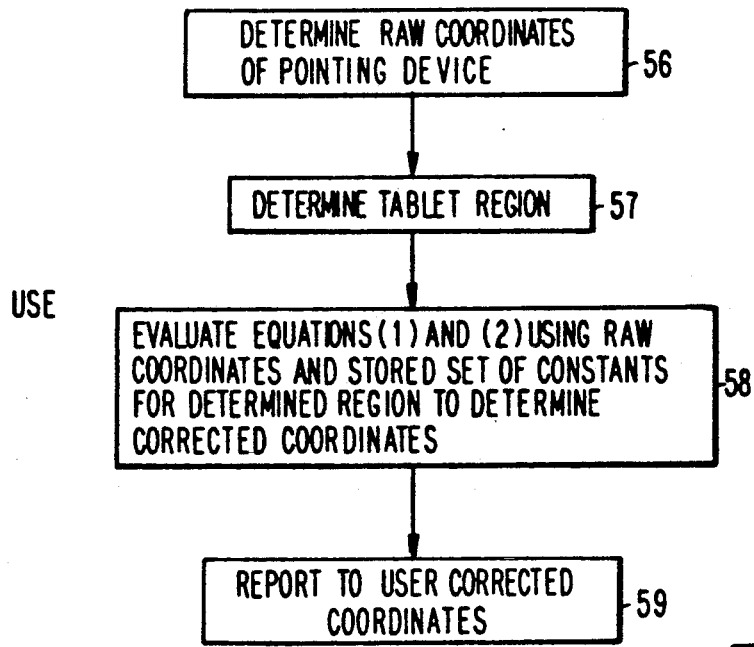

FIGS. 4a and 4b show a flow diagram of the procedure. In the initialization phase, at block 50 a determination is made of the tablet error pattern based on experience or actual testing. Then the pointing device is accurately located over at least four points in each region to establish its true coordinates at block 51, and the actual raw coordinates for each device position are collected and stored. The raw and true coordinates are plugged into equations (5) ... (12) to calculate 54 each of the constants a ... h. These sets of constants are stored 55 for each tablet region.

In operation by the user (FIG. 4b), the tablet software or firmware steps through an algorithm each time raw coordinates are measured by the tablet 56. First, at block 57, a determination is made of the tablet region under the pointing device. This step simply involves comparing the raw coordinates against four ranges for the assumed error pattern of FIG. 3A. Where the error pattern is simpler, as in FIG. 3C, a typical comparison, for example, would be: if $x_r$ (which can vary between 0 and 12) is in the range of $0<3$, it is region I; if in the range of 3–9, it is region II; if in the range of $>9$–12, it is region III.

Next, at block 58, equations (1) and (2) are evaluated by plugging in the stored set of constants for that particular tablet region and the raw coordinate values measured at block 56. These equations are evaluated in real time with a minimal penalty in the rate of reports that the table can output. The resultant corrected coordinate pairs, $X_c$, $Y_c$, are reported to the user or computer for controlling the display cursor position.

Figure 5:
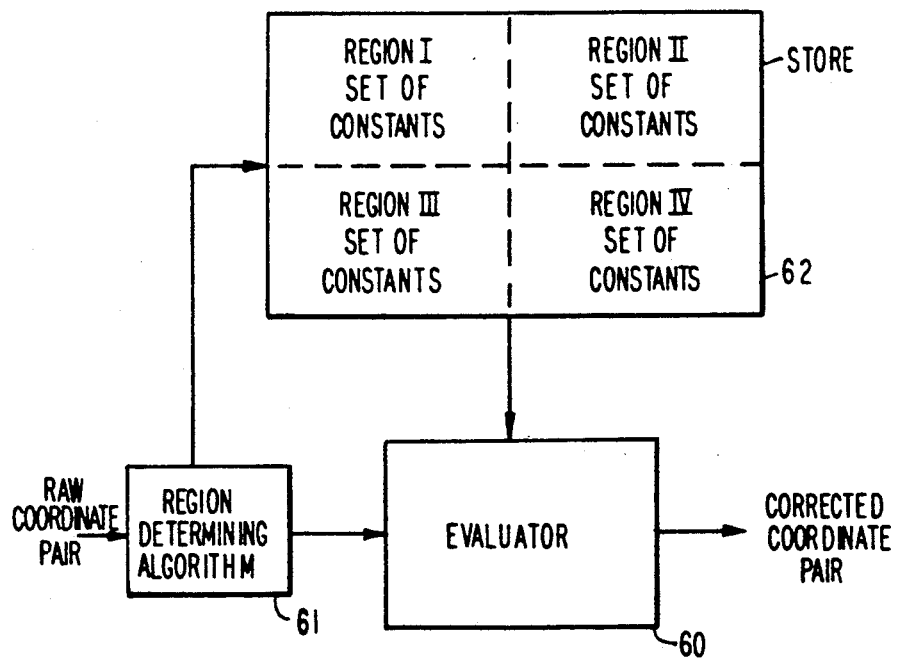
FIG. 5 is a block diagram of the additional circuitry to be added to the system of FIG. 1 to implement the invention.

It will be appreciated from the foregoing description that the tablet of the invention requires little or no additional hardware to implement the invention. The ROMs or PROMs currently used in each tablet need only have sufficient memory added to store the sets of constants unique for that tablet. Obviously, the computation of the equations can be accomplished in hardware (e.g. a coprocessor or dedicated multiplier-adder combinations) or in firmware. This is illustrated in FIG. 5. The raw coordinate pair inputted to an evaluator 60 for the linear equations (1) and (2) is the coordinate pair outputted in FIG. 1. Preferably, software is used 61 as described above to determine the tablet region involved. Memory 62 stores the sets of constants for each of the tablet regions, in this case four error regions I ... IV. Execution of the algorithm 61 selects one of the constant sets which is inputted, together with the raw coordinate pair, to the evaluator 60. The latter after evaluation then outputs the corrected values.

Preferably, however, the evaluator is implemented in software or firmware executed by the on-board microcontroller.

In addition to improving the accuracy of the reported coordinate values, the invention offers the advantages of customized regional error correction, which is permanently a part of the tablet firmware and stays with the tablet.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A method of correcting the X-Y coordinates outputted by a digitizer tablet having an active surface area defined by an array of electrodes extending over a defined x-y plane and interacting with a pointing device to be placed over the active surface area and having circuitry for responding to signals induced in the point device or electrodes and for processing those signals to generate X-Y coordinate pairs representative of the position of the pointing device over the tablet, said X-Y coordinate pairs generated when the pointing device is located over plural different tablet regions incorrectly reporting the true position of the pointing device, the steps comprising:

(a) storing constants of at least one equation which when evaluated with a raw coordinate data produces corrected coordinate pairs for each of the said tablet regions, said equation making the corrected coordinate for each tablet axis a function of the pointing device position with respect to plural tablet axes, (b) during normal operation of the tablet, evaluating the equation using the tablet generated raw coordinate data and the stored constants for each of said regions to produce corrected coordinate pairs for each pointing device position over the said regions, (c) outputting the corrected coordinate pairs obtained in step (b).

2. A method of correcting the X-Y coordinates outputted by a digitizer tablet having an active surface area defined by an array of electrodes extending over a defined x-y plane and interacting with a pointing device to be placed over the active surface area and having circuitry for responding to signals induced in the pointing device or electrodes and for processing those signals to generate X-Y coordinate pairs representative of the position of the pointing device over the tablet, said X-Y coordinate pairs generated when the pointing device is located over different tablet regions incorrectly reporting the true position of the pointing device, the steps comprising:

(a) storing a set of constants of sum terms of an equation which when evaluated with raw coordinate data produces corrected coordinate pairs for each of the said tablet regions, said set of constants being different for some of the tablet regions, (b) during normal operation of the tablet, evaluating the equation using the tablet generated raw coordinate data and the stored set of constants for the said regions to produce corrected coordinate pairs for each pointing device position over said regions, (c) outputting the corrected coordinate pairs obtained in step (b).

3. The method of claim 2, wherein the said regions include edge regions of the tablet.

4. The method of claim 2, wherein the said regions include corner regions of the tablet.

5. The method of claim 2, wherein the equation is linear.

6. The method of claim 5, wherein a linear equation is provided for each of the X and Y coordinates of the tablet.

7. The method of claim 6, wherein the set of constants used in each equation is different.

8. The method of claim 2, wherein the equation used to compute the corrected value for the X coordinate is:

$$X_c = ax_r + by_r + cx_r y_r + d;$$

where $X_c$ is the corrected X value, a, b, c, and d are the set of constants, and $x_r$ and $y_r$ are the raw x-y coordinate pairs.

9. The method of claim 2, wherein the equation used to compute the corrected value for the Y coordinate is:

$$Y_c = ex_r + fy_r + gx_r y_r + h;$$

where $Y_c$ is the corrected Y value, e, f, g, and h are the set of constants, and $x_r$ and $y_r$ are the raw x-y coordinate pairs.

10. A method of correcting the X-Y coordinates outputted by a digitizer tablet having an active surface area defined by an array of electrodes extending over a defined x-y plane and interacting with a pointing device to be placed over the active surface area and having circuitry for responding to signals induced in the pointing device or electrode and for processing those signals to generate X-Y coordinate pairs representative of the position of the pointing device over the tablet, said X-Y coordinate pairs generated when the pointing device is located over certain tablet regions incorrectly reporting the true position of the pointing device, the steps comprising:

(a) dividing the tablet into a plurality of regions exhibiting similar error characteristics, (b) determining for each of said regions sets of constants of the sum terms of two linear equations containing the raw coordinate data, $x_r$ and $y_r$, which when evaluated will provide corrected coordinate pairs, $X_c$, $Y_c$ for the said tablet regions, (c) permanently storing in the tablet said sets of constants determined in step (b), (d) during normal operation of the tablet, determining when the pointing device is over one of said regions and which region, (e) determining the raw coordinate pair for said pointing device when over one of said regions, (f) evaluating the said linear equations using the information obtained in step (d) to identify an associated set of constants for that region and the information obtained in step (c) to produce the corrected coordinate pair, $X_c$, $Y_c$, for that pointing device position, (g) outputting the coordinate pair, $X_c$, $Y_c$, obtained in step (f).

11. The method of claim 10, wherein the equation used to compute the corrected value for the $X_c$ coordinate is:

$$X_c = ax_r + by_r + c_r y_r + d;$$

where $X_c$ is the corrected X value, a, b, c, and d are the computed constants, and $x_r$ and $y_r$ are the raw x-y coordinate pairs, and the equation used to compute the corrected value for the $Y_c$ coordinate is:

$$Y_c = ex_r + fy_r + gx_r y_r + h;$$

where $Y_c$ is the corrected Y value, e, f, g, and h are the computed constants, and $x_r$ and $y_r$ are the raw x-y coordinate pairs.

12. The method of claim 11, wherein the division according to step (a) results in an error pattern corresponding to that illustrated in one of FIGS. 3A-3D.

13. The method of claim 11, wherein step (b) is carried out by evaluating equations derived from said linear equations using empirical true and raw coordinate pairs for several points over each of said regions.

14. A digitizer tablet with improved regional error correction and having an active surface area defined by an array of electrodes extending over a defined x-y plane and interacting with a pointing device to be placed over the active surface area and having circuitry for responding to signals induced in the pointing device or electrodes and for processing those signals to generate X-Y coordinate pairs representative of the position of the pointing device over the tablet, said X-Y coordinate pairs generated when the pointing device is located over certain of the electrode array regions incorrectly reporting the true position of the pointing device, the improvement comprising:

(a) means for storing constants of the terms of at least one equation which when evaluated with raw coordinate data, $x_r$ and $y_r$, from one of said regions produces corrected coordinate pairs, $X_c$ and $Y_c$, said equation making the corrected coordinate for each tablet axis a function of the pointing device position with respect to plural tablet axes, (b) means for evaluating the said equation using the stored constants when the pointing device is over one of said regions, (c) means for outputting the corrected coordinate pairs, $X_c$ and $Y_c$, producing by the evaluation means of (b).

15. A digitizer tablet with improved regional error correction and having an active surface area defined by an array of electrodes extending over a defined x-y plane and interacting with a pointing device to be placed over the active surface area and having circuitry for responding to signals induced in the pointing device or electrodes and for processing those signals to generate X-Y coordinate pairs representative of the position of the pointing device over the tablet, said X-Y coordinate pairs generated when the pointing device is located over certain of the electrode array regions incorrectly reporting the true position of the pointing device, the improvement comprising:

(a) means for storing a set of constants of the sum terms of an equation which when evaluated with raw coordinate data, $x_r$ and $y_r$, from one of said regions produces corrected coordinate pairs, $X_c$ and $Y_c$, (b) means for evaluating the said equation using the stored constants when the pointing device is over one of said regions, (c) means for outputting the corrected coordinate pairs, $X_c$ and $Y_c$, produced by the evaluation means of (b).

16. The tablet of claim 15, wherein two linear equations are evaluated.

17. A digitizer tablet with improved regional error correction and having an active surface area defined by an array of electrodes extending over a defined x-y plane and interacting with a pointing device to be placed over the active surface area and having circuitry for responding to signals induced in the pointing device or electrodes and for processing those signals to generate X-Y coordinate pairs representative of the position of the pointing device over the tablet, said X-Y coordinate pairs generated when the point device is located over certain of the electrode array regions incorrectly reporting the true position of the pointing device, the improvement comprising:

(a) means for storing a set of constants of the sum terms of two linear equations which when evaluated with raw coordinate data, $x_r$ and $y_r$, from one of said regions produces corrected coordinate pairs, $X_c$ and $Y_c$, (b) means for evaluating the said equations using the stored constants when the pointing device is over one of said regions, (c) means for outputting the corrected coordinate pairs, $X_c$ and $Y_c$, produced by the evaluation means of (b), (d) the equation used to compute the corrected value for the $X_c$ coordinate being:

$$X_c = ax_r + by_r + cx_rY_r + d;$$

where $X_c$ is the corrected X value, a, b, c, and d are the computed constants, and $x_r$ and $y_r$ are the raw x-y coordinate pairs, (e) the equation used to compute the corrected value for the $Y_c$ coordinate being:

$$Y_c = ex_r + fy_r + gx_rY_r + h;$$

wherein $Y_c$ is the corrected Y value, e, f, g, and h are the computed constants, and $x_r$ and $y_r$ are the raw x-y coordinate pairs.

18. The tablet of claim 17, wherein a set of constants is stored for each of the said regions.

19. The method of claim 2, wherein the said equation for correcting the raw coordinate data for the X or Y coordinate is a function of the raw coordinate values for both the X and Y coordinates.

* * * * *